April 22, 1958 E. H. GATZERT 2,831,930

TEST CONNECTOR SYSTEM

Filed Sept. 7, 1955 4 Sheets-Sheet 1

INVENTOR.
ERNEST H. GATZERT

BY Francis E. Blake

ATTORNEY

April 22, 1958 E. H. GATZERT 2,831,930

TEST CONNECTOR SYSTEM

Filed Sept. 7, 1955 4 Sheets-Sheet 2

April 22, 1958 E. H. GATZERT 2,831,930

TEST CONNECTOR SYSTEM

Filed Sept. 7, 1955 4 Sheets-Sheet 3

April 22, 1958 E. H. GATZERT 2,831,930

TEST CONNECTOR SYSTEM

Filed Sept. 7, 1955 4 Sheets-Sheet 4

2,831,930

TEST CONNECTOR SYSTEM

Ernest H. Gatzert, Rochester, N. Y., assignor to General Dynamics Corporation, a corporation of Delaware Application September 7, 1955, Serial No. 532,992
12 Claims. (Cl. 179—175.2)

The present invention relates to telephone systems, and more particularly to improvements in impulse responsive automatic switching systems as used for dial telephone operation.

It is a principal object of the present invention to provide an improved, simpler, and more economical type of automatic telephone switching system to be used for special purposes.

As is well known, automatic telephone systems still require the use of an operator for many specialized functions. One of the duties which an operator is called upon to perform in the operation of an automatic telephone system is to verify the busy condition of a line. It seems unavoidable that through occasional failures of the equipment, the automatic switching equipment will not operate properly in that a desired line appears to be busy when in actuality the line is idle. As mentioned previously, when such condition arises, a test operator is required to operate a special verification train of impulse responsive automatic switches to seize the apparently busy line and thereby monitor the line to determine if the line is actually busy. Also, it is sometimes desirable for a toll operator to be able to seize a busy line and advise the parties on the line that the line is needed for a long distance or emergency call.

Prior to this invention, the aforementioned verification train of impulse responsive automatic switches has included the usual selector and connector switches and associated control circuits with the additional provisions for switching the connector through to a busy line instead of returning busy tone and preventing the switchthrough.

An important object of this invention is to provide a simplified form of impulse responsive automatic switch train which may be advantageously used for busy verification functions.

Another important object of the invention is to provide an improved impulse responsive automatic switch train which may be used to select any one of a large number of lines arranged in a plurality of groups of lines such as would ordinarily require both selector and connector switches and associated control circuits but having, according to the invention, only one control circuit with relays for the operation of all of the various selector and connector switches.

Figure 1:
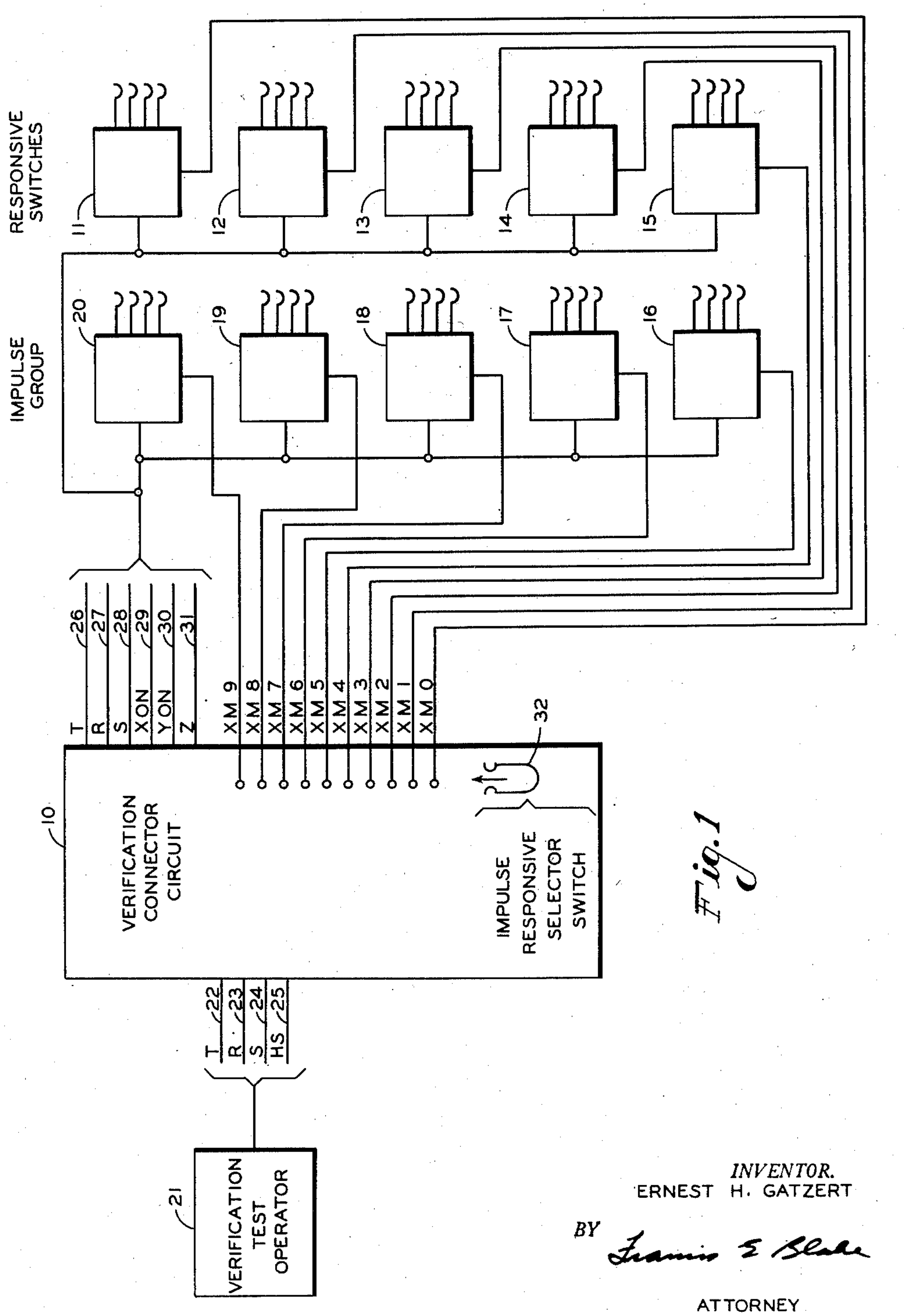
Figure 2:
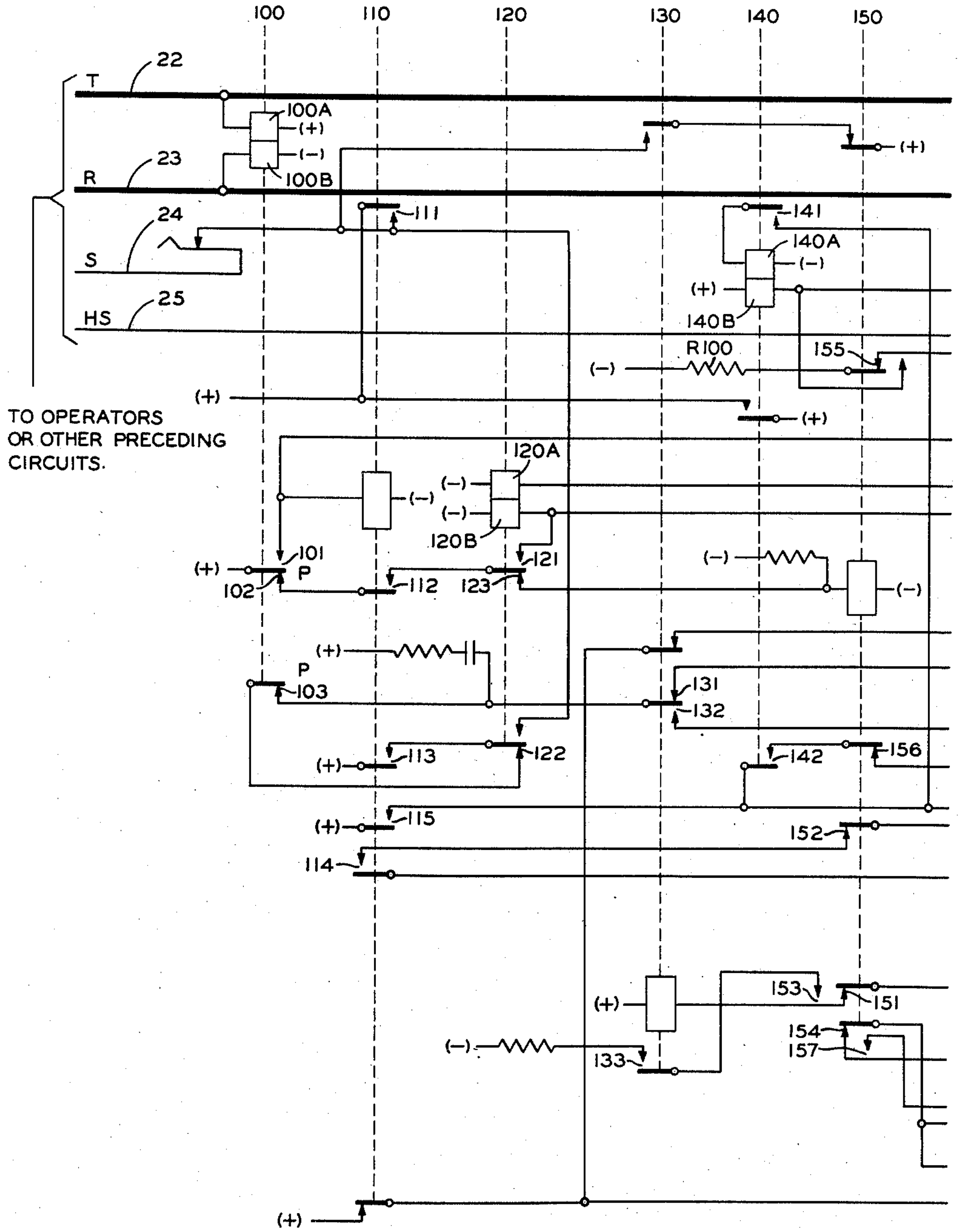
Figure 3:
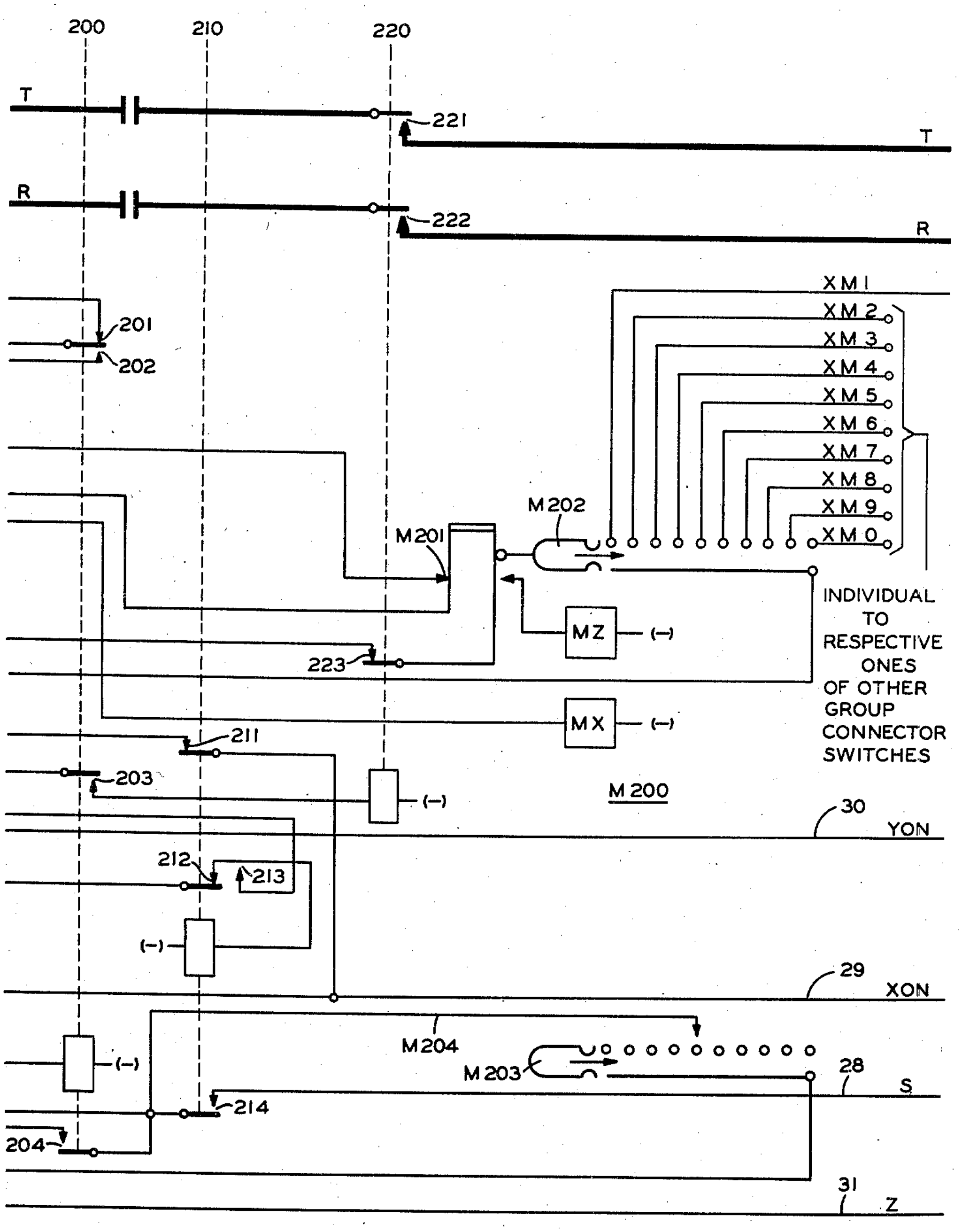
Figure 4:
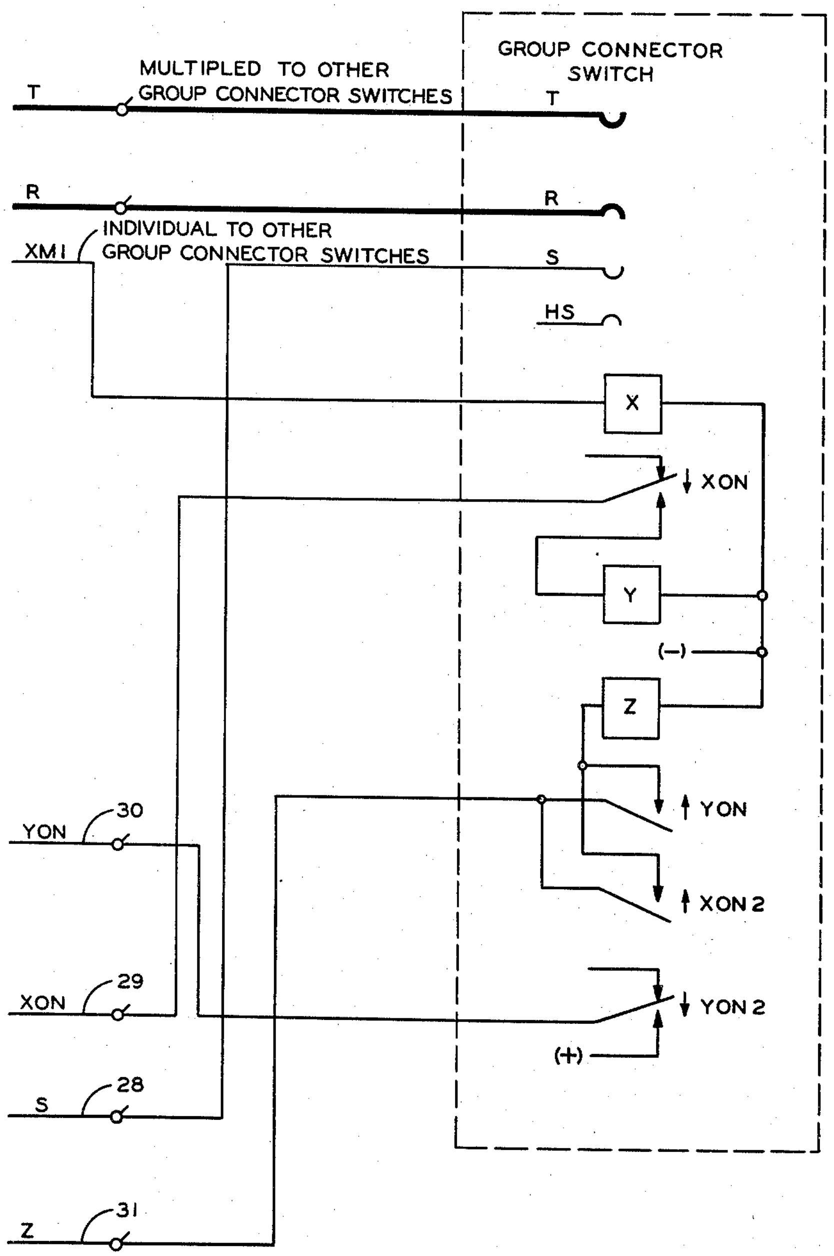

Other objects, advantages, and the attending features of the invention will be apparent with reference to the following specification and drawings in which:

Fig. 1 is a block diagram of the impulse responsive automatic switching system of the invention as particularly used for a verification switch train; and Figs. 2–4, when taken together and placed side by side in order from left to right, show a schematic wiring diagram of the circuit details of a preferred form of impulse responsive automatic switching system shown in the block diagram of Fig. 1.

Referring to Fig. 1 of the drawings, the verification connector control circuit is shown by the block outline 10 and respective ones of impulse responsive group connector switches are shown by the block outlines at 11–20. Since the switching system of the invention is to be particularly described in connection with its use as a verification switch train, the verification test operator position is shown in block outline at 21. The verification test operator position 21 may be connected through the usual telephone circuits including cord circuits and trunk circuits (not shown) which are connected by the usual tip, ring, sleeve, and hunt sleeve conductors 22–25 to the verification connector circuit 10. The verification connector circuit 10 includes the usual impulse responsive relays and other control relays to respond to the dialed impulses from the verification test operator position in order to extend the desired connection to a selected one of the impulse responsive group switches 11–20 and a desired line as may be selected by the particular impulse responsive group switch. Various talking and control conductors including tip conductor 26, ring conductor 27, sleeve conductor 28, X-off-normal conductor 29, Y-off-normal conductor 30, and Z-conductor 31 are connected in multiple between the verification connector circuit 10 and each of the impulse responsive group connector switches 11–20. In addition, one of the individual control conductors XM0–XM9 is connected to a respective one of the impulse responsive group connector switches 11–20. An impulse responsive selector switch, generally shown at 32 within the verification circuit block outline 11, is arranged to be operated to select a particular one of the individual control conductors XM0–XM9.

Still referring to Fig. 1 of the drawings, a general description of the operation of the impulse responsive automatic switching system of the invention is as follows. The verification test operator seizes the verification connector circuit 10 in the usual manner and the first group of dial impulses following such seizure are caused to operate the impulse responsive selector switch 32 to select a particular one of the individual control conductors XM0–XM9. Depending upon the number of impulses in the aforementioned first group of dial impulses, the selector switch 32 will through its selection of a particular one of the control conductors XM0–XM9 cause a respective one only of the impulse responsive group connector switches 11–20 to respond to the second group of dial impulses which is thereafter connected over the respective selected one of the individual control conductors XM0–XM9 to the respective impulse responsive connector switch. Thus, a selected one of the impulse responsive group connector switches 11–20 will move off-normal in a first direction in the first process of selecting a line in the group of lines to which it has access. Due to the off-normal position of the selected impulse responsive group connector switch, the third group of dial impulses, which is thereafter connected over the multipled control conductor XON to all of the group connector switches 11–20, causes only the off-normal one of the impulse responsive group connector switches to move in the second direction and select a desired line in the group of lines. It should be apparent that the impulse responsive automatic switching system of the invention as described above results in a saving in relays and control circuits due to the combinations of individual and multiple control conductors from the single connector control circuit 10 to the plurality of impulse responsive group connector switches 11–20. Of course, such a system has its primary utility in a verification switch train since there are no provisions for the extension of more than one call at a time to any of the groups of lines.

Reference is now made to Figs. 2–4 of the drawings for a detailed description of the circuit features of a presently preferred form of the invention. The power source (not shown) is indicated by the positive and negative symbols, which may also be referred to as ground and battery, respectively. The tip, ring, sleeve and HS conductors from the preceding telephone and verification test operator circuits, which were identified as conductors 22–25, respectively, in Fig. 1 of the drawings, are identified with corresponding numerals at the upper left hand corner of Fig. 2 of the drawings. To seize the verification connector circuit indicated as 10 in Fig. 1 of the drawings and shown in detail by Figs. 2 and 3 of the drawings, a loop is closed over the tip and ring conductors 22 and 23 to cause the calling bridge relay 100 to operate from ground through its upper winding 100A and the calling line loop circuit to its lower winding 100B and battery. It might be pointed out at this time that Fig. 4 of the drawings shows in detail only one of the plurality of impulse responsive group connector switches as indicated as 11–20 on Fig. 1 of the drawings.

The operation of the calling bridge relay 100 closes pulsing contacts 101 and connects a circuit from ground through the coil of the release delay relay 110 to battery and causes the operation of such relay. The operation of the release delay relay 110 closes contacts 111 to connect ground to the sleeve conductor 24 and identify the verification connector circuit as busy. The previously mentioned operation of the calling bridge relay 100 to close pulsing contacts 101 also causes the X-delay relay 120 to operate through the circuit from battery, relay coil winding 120A, normally closed off-normal contacts M201, and operated contacts 101 to ground. The operation of X-delay relay 120 closes contacts 121 to prepare a pulsing path to the selector switch operating magnet MX. Upon the first dial impulse in the first group of dial impulses, the calling bridge relay 100 is momentarily restored to close the pulsing contacts 102 connecting ground through operated contacts 112 and the aformentioned operated contacts 121 to the operating coil MX and battery of the selector switch generally shown at M200. Thus, as the calling bridge relay 100 operates and restores in response to the impulses of the first group of dial impulses, the selector switch magnet MX is alternately energized and deenergized to step the selector switch wiper M202 to a corresponding position in contact with a respective one of the individual control conductors XM0–XM9.

Also upon the first restoration of the calling bridge relay 100 in response to the first dial impulse, the lower winding 120B of the X-delay relay 120 is energized from battery through operated contacts 121, 112, and normal contacts 102 to ground, thus maintaining the X-delay relay 120 operated during the period of the application of the first group of dial impulses even though the operating circuit for the X-delay relay 120 from battery through its upper coil 120A is open at the then open and operated off-normal contacts M201 of the selector switch M200. At the completion of the first group of dial impulses, contacts 101 are again closed and contacts 102 opened to break the operating circuit to the lower winding 120B of the X-delay relay 120 which allows such relay to restore.

The second group of dial impulses is then transmitted over the tip and ring conductors 22 and 23 to cause the calling bridge relay 100 to again respond by momentarily closing contacts 102 and 103. The aforementioned operation of release delay relay 110, which is slow to release, remains operated, of course, during the energization and impulsing of the calling bridge relay 100. Therefore, upon the first restoration of the calling bridge relay 100 in response to the second group of dial impulses, ground is connected through operated contacts 113, now restored contacts 122, pulsing contact 103, normal contacts 131, and selector switch wiper M202 to a selected one of the individual control conductors XM0–XM9 and thereover to selectively operate the X-magnet of a particular group connector switch, shown in Fig. 4. Thus, the wipers of the group selector switch of Fig. 4 are moved in the first direction by the alternate energization and deenergization of the X-magnet (Fig. 4) in response to the number of impulses in the second group of impulses. Also at the time that the calling bridge relay 100 restores in response to the first impulse in the second group of impulses, the slow release relay 150 is operated from battery through now closed contacts 123, operated contacts 112, and pulsing contacts 102 to ground. Relay 150 being slow to release, remains operated during the transmission of the second group of impulses and opens a circuit at operated contacts 151 to prevent operation of relay 130 from ground through the XON common control conductor 29 and the Y-magnet of the selected group selector switch to battery. The aforementioned operation of the slow to release relay 150 also opens contacts 152 to prevent operation of relay 210 during the application of the second group of dial impulses. Therefore, in response to the second group of dial impulses of the calling bridge relay 100, the selected group connector switch is operated off-normal in the first direction by the alternate energization and deenergization of its X-magnet over the selected individual control conductors XM0–XM9.

At the end of the second group of dial impulses, the slow to release relay 150 is again restored since the pulsing contact 102 remains open for a period of time greater than the release time of the relay 150. Relay 150, upon restoring, closes contact 151 which completes a circuit from battery at the then off-normal group connector switch, through the Y-magnet coil, the X-off-normal contact XON, the X-off-normal multipled control conductor 29, closed contacts 151, and the coil of relay 130 to ground causing relay 130 to operate. The amount of current required to operate relay 130 as conducted through the aforementioned path in series with the Y-magnet of the selected group connector switch does not energize the Y-magnet sufficiently to operate the group connector switch off-normal in the second direction. With relay 130 now operated, the next restoration of the calling bridge relay 100 in response to the first impulse in the third group of dial impulses completes a circuit from ground through operated contacts 113, closed contacts 122, 103, operated contacts 132, normally closed contacts 211, and the multipled X-off-normal lead 29 through operated off-normal contact XON and the Y-magnet of the selected group selector switch to battery, thus energizing the Y-magnet and stepping only that group connector switch in the second direction. In such manner, a line is selected by the off-normal movement in the second direction of the selected group selector switch in response to the energization of the Y-magnet by the third group of dial impulses. During the transmission of the third group of dial impulses, the slow to release relay 150 again is energized to open contacts 151 and close contacts 153 to transfer the operating circuit for relay 130 through its operated and closed contacts 133 to battery. At the completion of the third group of dial impulses, therefore, only relay 150 restores since relay 130 is held operated through the previous circuit or the normally closed contacts 151 and the X-off-normal lead 29.

It will first be assumed that the lines to be selected by the particularly selected group connector switch of Fig. 4 are private lines not requiring the dialing of a party digit. Under such circumstances, the particular position of the minor switch M200 and its wiper M203 will connect through the jumper wire M204, the sleeve test conductor 28 of the group connector switch to the busy test relay 200 through a circuit to be traced hereafter. It should be pointed out, however, that relay 210 is first operated from battery through normally closed contacts 212, operated contacts 114, normally closed contacts 152, and the Y-off-normal multipled control conductor 30 to the now closed Y-off-normal contact YON2 and ground of the group connector switch that is now off-normal in both the first and second directions. Relay 210 locks up through operated contacts 213 to the ground provided by operated contacts 115 of the release delay relay 110. With relay 210 operated, the circuit is now complete from the sleeve conductor 28 of the group connector switch that is off-normal in both the first and second directions, operated contacts 214, selector switch jumper M204, selector switch wiper M203, normally closed contacts 154 to the coil of the busy test relay 200 and battery. It will be remembered that the switch train being specifically described is a busy verification system and if the line now selected is busy, ground will be present on its sleeve conductor to energize and operate the busy test relay 200 through the aformentioned circuit.

It is not desired to permit everyone having access to to the subject circuits to switchthrough to a busy line unless they should be a busy verification operator or other authorized person. Assume that a busy verification operator is extending the call and operating the circuits as described, the operator at her operator's circuit (not shown) will connect battery to the hunt sleeve conductor 25 which is connected through normally closed contacts 201 to the lower winding 140B of relay 140 and ground to cause relay 140 to operate. Relay 140, when operated, is locked to battery through its upper winding 140A, operated contacts 141 and operated contacts 115 of the release delay relay 110 to ground. As soon as the busy test relay 200 operates upon connection to a busy line, contacts 201 are opened and contacts 202 are closed to connect resistance battery as provided from battery through the resistance R100 and the normally closed contacts 155 to the HS conductor 25 thereby signaling the operator that a busy line has been connected with. At the same time that the busy test relay 200 operates, the switchthrough relay 220 will be operated from battery through its winding, operated contacts 203, normal contacts 156, operated contacts 142 and through operated contacts 115 of the release delay relay to ground. The operation of the switchthrough relay 220 closes contacts 221 and 222 to connect the talking conductors 22 and 23 to the multipled tip and ring of conductors of the group connector switches and therefore the tip and ring brushes of the selected group connector switch as operated into contact with the selected busy line. Thus the verification operator is enabled to monitor the busy line and converse, if necessary. The aforementioned operation of the switchthrough relay 220 also opens contacts 223 to prevent any operation of the release magnet MZ of the selector switch M200 so long as the switch through relay 220 remains energized.

At the completion of the call, the operator will hang up to restore the calling bridge relay 100 and the release delay relay 110, thus effecting a release of the remaining operated relays and switches in a conventional manner through the opening of various holding grounds and the energizations of the release magnets MZ and Z as will be obvious to anyone skilled in the art.

It will now be assumed that the particularly selected group connector switch of Fig. 4 is one having access to a group of party lines for which a party digit must be absorbed. In such circumstances, there will be no jumper connection M204 and therefore the connection from the sleeve conductor of the group connector switch to the busy test relay 200 must be extended through operated contacts 214 of relay 210 and operated contacts 157 of relay 150. Relay 150, however, is restored at the end of the third group of dial impulses and will not be reoperated until application of a fourth group of dial impulses causing consequent operation and release of the calling bridge relay 100. More specifically, at the conclusion of the third group of dial impulses, relay 210 will be operated and locked, as previously described, from the ground originally appearing on the Y-off-normal multipled control conductor 30 due to the off-normal position of the selected group selector switch in the second direction. Thereafter, when the first impulse of the fourth group of dial impulses causes the calling bridge relay 100 to restore and again operate, the slow to release relay 150 will again be operated to remain operated during the entire group of fourth impulses. However, at this time no pulsing path is prepared to any of the individual or common control conductors so that the group connector switch of Fig. 4 remains at the previously selected position in both the first and second directions. Therefore, if the selected line is busy and ground is appearing on its sleeve terminal, ground will be connected over the multipled control sleeve conductor 28 through operated contacts 214 and now operated contacts 157 of the slow to release relay 150 to cause the busy test relay 200 to operate. Busy test relay 200 then locks up over operated contacts 204 so that it will remain operated after the slow to release relay 150 restores at the end of the transmission of the fourth group of dial impulses. This holding path is from battery through winding of busy test relay 200, normal contacts 154, and operated contacts 204 and 214 to the sleeve conductor of the busy line.

In the foregoing, one detailed version of the impulse responsive automatic switching system of the invention has been described in connection with its application to a busy verification switch train. It is obvious that the principles of the invention may be applied to any impulse responsive automatic switch train whether it be used as a verification switching train for telephone systems or not. The principal feature of the invention, as described, is the use of both individual and multipled control conductors responding to a first selection of an individual control conductor for moving the particular connector switch off-normal in a first direction and thereafter responsive over the multipled control conductors to move the particular off-normal switch off-normal again in the second direction and complete the selection of a line.

Various modifications may be made within the spirit of the invention and the scope of the appended claims.

What is claimed is:

1. In a telephone system, a plurality of groups of lines, an impulse responsive connector switch for each group of lines, talking conductors connected in multiple to each connector switch, a control conductor connected in multiple to each connector switch, an individual control conductor connected to each of said connector switches respectively, an impulse responsive switch operative to select one of said individual control conductors, and means operative over said selected individual control conductor to cause the connector switch individual thereto to respond to impulses transmitted over said multipled control conductor and select a line in a particular group of lines.

2. In a telephone system, a plurality of groups of lines, an impulse responsive two-motion connector switch for each group of lines, talking conductors connected in multiple to each connector switch, a control conductor connected in multiple to each connector switch, an individual control conductor connected to each of said connector switches respectively, an impulse responsive selector switch operative to select one of said individual control conductors, means to transmit a group of impulses to said selector switch to cause said switch to selectively connect with an individual control conductor, means to transmit a group of impulses over said selected individual control conductor to cause the connector switch individual thereto to move off-normal in a first direction, means responsive to the off-normal position in the first direction of a respective one of said connector switches to cause said respective switch only to respond to a group of impulses transmitted over said multipled control conductor, and means to transmit a group of impulses over said multipled control conductor to cause said respective switch to move off-normal in a second direction to select a line in a particular group of lines.

3. In a telephone system, a plurality of groups of lines, an impulse responsive two-motion connector switch for each group of lines, talking conductors connected in multiple to each connector switch, a plurality of control conductors connected in multiple to each connector switch, an individual control conductor connected to each of said connector switches respectively, an impulse responsive selector switch operative to select one of said individual control conductors, means to transmit a group of impulses to said selector switch to cause said switch to selectively connect with an individual control conductor, means to transmit a group of impulses over said selected individual control conductor to cause the connector switch individual thereto to move off-normal in a first direction, means responsive to the off-normal position in the first direction of a respective one of said connector switches to cause said respective switch only to respond to a group of impulses transmitted over one of said multipled control conductors, means to transmit a group of impulses over said one multipled control conductor to cause said respective switch to move off-normal in a second direction to select a line in a particular group of lines, and means controlled over a second of said control conductors for restoring an off-normal one of said connector switches to normal.

4. In a telephone system, a plurality of groups of lines, an impulse responsive two-motion connector switch for each group of lines, talking conductors connected in multiple to each connector switch, a plurality of control conductors connected in multiple to each connector switch, an individual control conductor connected to each of said connector switches respectively, an impulse responsive selector switch operative to select one of said individual control conductors, means to transmit a group of impulses to said selector switch to cause said switch to selectively connect with an individual control conductor, means to transmit a group of impulses over said selected individual control conductor to cause the connector switch individual thereto to move off-normal in a first direction, means responsive to the off-normal position in the first direction of a respective one of said connector switches to cause said respective switch only to respond to a group of impulses transmitted over one of said multipled control conductors, means to transmit a group of impulses over multipled control conductor to cause said respective switch to move off-normal in a second direction to select a line in a particular group of lines, and means responsive to the idle or busy condition of a selected line in a particular group of lines to control over a second one of said multipled control conductors the operation of a busy signal device.

5. In a telephone system, a plurality of groups of lines, an impulse responsive two-motion connector switch for each group of lines, talking conductors connected in multiple to each connector switch, a plurality of control conductors connected in multiple to each connector switch, an individual control conductor connected to each of said connector switches respectively, an impulse responsive selector switch operative to select one of said individual control conductors, means to transmit a group of impulses to said selector switch to cause said switch to selectively connect with an individual control conductor, means to transmit a group of impulses over said selected individual control conductor to cause the connector switch individual thereto to move off-normal in a first direction, means responsive to the off-normal position in the first direction of a respective one of said connector switches to cause said respective switch only to respond to a group of impulses transmitted over one of said multipled control conductors, means to transmit a group of impulses over said multipled control conductor to cause said respective switch to move off-normal in a second direction to select a line in a particular group of lines, and means responsive to an off-normal position of a connector switch in the second direction and controlled over a second one of said multipled control conductors to prevent the transmission of additional groups of impulses over said one multipled control conductor to said connector switches.

6. In a telephone system, a plurality of groups of lines, an impulse responsive two-motion connector switch for each group of lines, talking conductors connected in multiple to each connector switch, a plurality of control conductors connected in multiple to each connector switch, an individual control conductor connected to each of said connector switches respectively, an impulse responsive selector switch operative to select one of said individual control conductors, means to transmit a group of impulses to said selector switch to cause said switch to selectively connect with an individual control conductor, means to transmit a group of impulses over said selected individual control conductor to cause the connector switch individual thereto to move off-normal in a first direction, means responsive to the off-normal position in the first direction of a respective one of said connector switches to cause said respective switch only to respond to a group of impulses transmitted over one of said multipled control conductors, means to transmit a group of impulses over said one multipled control conductor to cause said respective switch to move off-normal in a second direction to select a line in a particular group of lines, means controlled over a second of said control conductors for restoring an off-normal one of said connector switches to normal, and means responsive to the idle or busy condition of a selected line in a particular group of lines to control over a third one of said multipled control conductors the operation of a busy signal device.

7. In a telephone system, a plurality of groups of lines, an impulse responsive two-motion connector switch for each group of lines, talking conductors connected in multiple to each connector switch, a plurality of control conductors connected in multiple to each connector switch, an individual control conductor connected to each of said connector switches respectively, an impulse responsive selector switch operative to select one of said individual control conductors, means to transmit a group of impulses to said selector switch to cause said switch to selectively connect with an individual control conductor, means to transmit a group of impulses over said selected individual control conductor to cause the connector switch individual thereto to move off-normal in a first direction, means responsive to the off-normal position in the first direction of a respective one of said connector switches to cause said respective switch only to respond to a group of impulses transmitted over one of said multipled control conductors, means to transmit a group of impulses over said one multipled control conductor to cause said respective switch to move off-normal in a second direction to select a line in a particular group of lines, means controlled over a second of said control conductors for restoring an off-normal one of said connector switches to normal, and means responsive to an off-normal position of a connector switch in the second direction and controlled over a third one of said multipled control conductors to prevent the transmission of additional groups of impulses over said one multipled control conductor to said connector switches.

8. In a telephone system, a plurality of groups of lines, an impulse responsive two-motion connector switch for each group of lines, talking conductors connected in multiple to each connector switch, a plurality of control conductors connected in multiple to each connector switch, an individual control conductor connected to each of said connector switches respectively, an impulse responsive selector switch operative to select one of said individual control conductors, means to transmit a group of impulses to said selector switch to cause said switch to selectively connect with an individual control conductor, means to transmit a group of impulses over said selected individual control conductor to cause the connector switch individual thereto to move off-normal in a first direction, means responsive to the off-normal position in the first direction of a respective one of said connector switches to cause said respective switch only to respond to a group of impulses transmitted over one of said multipled control conductors, means to transmit a group of impulses over said one multiple control conductor to cause said respective switch to move off-normal in a second direction to select a line in a particular group of lines, means responsive to the idle or busy condition of a selected line in a particular group of lines to control over a second one of said multipled control conductors the operation of a busy signal device, and means responsive to an off-normal position of a connector switch in the second direction and controlled over a third one of said multipled control conductors to prevent the transmission of additional groups of impulses over said one multipled control conductor to said connector switches.

9. In a telephone system, a plurality of groups of lines, an impulse responsive two-motion connector switch for each group of lines, talking conductors connected in multiple to each connector switch, a plurality of control conductors connected in multiple to each connector switch, an individual control conductor connected to each of said connector switches respectively, an impulse responsive selector switch operative to select one of said individual control conductors, means to transmit a group of impulses to said selector switch to cause said switch to selectively connect with an individual control conductor, means to transmit a group of impulses over said selected individual control conductor to cause the connector switch individual thereto to move off-normal in a first direction, means responsive to the off-normal position in the first direction of a respective one of said connector switches to cause said respective switch only to respond to a group of impulses transmitted over one of said multipled control conductors, means to transmit a group of impulses over said one multipled control conductor to cause said respective switch to move off-normal in a second direction to select a line in a particular group of lines, means controlled over a second of said control conductors for restoring an off-normal one of said connector switches to normal, means responsive to the idle or busy condition of a selected line in a particular group of lines to control over a third one of said multipled control conductors the operation of a busy signal device, and means responsive to an off-normal position of a connector switch in the second direction and controlled over a fourth one of said multipled control conductors to prevent the transmission of additional groups of impulses over said one multipled control conductor to said connector switches.

10. In a telephone system, a plurality of groups of lines, an impulse responsive two-motion connector switch for each group of lines, talking conductors connected in multiple to each connector switch, a plurality of control conductors connected in multiple to each connector switch, an individual control conductor connected to each of said connector switches respectively, an impulse responsive switch operative in response to a first group of impulses to select one of said individual control conductors, means operative over said selected individual control conductor to cause the connector switch individual thereto to move off-normal in a first direction in response to a second group of impulses, means responsive to the off-normal position in the first direction of a respective one of said connector switches to cause said respective switch only to respond to a third group of impulses transmitted over a first of said multipled control conductors and move off-normal in a second direction to select a line in a particular group of lines, and means operative in response to an off-normal position of the respective connector switch in the second direction to control over a second of said control conductors and prevent the transmission of additional groups of impulses over said first control conductor to the connector switches.

11. In a telephone system, a plurality of groups of lines, an impulse responsive two-motion connector switch for each group of lines, talking conductors connected in multiple to each connector switch, a plurality of control conductors connected in multiple to each connector switch, an individual control conductor connected to each of said connector switches respectively, and impulse responsive selector switch operative in response to a first group of impulses to select one of said individual control conductors, means operative over said selected individual control conductor to cause the connector switch individual thereto to move off-normal in a first direction in response to a second group of impulses, means responsive to the off-normal position in the first direction of a respective one of said connector switches to cause said respective switch only to respond to a third group of impulses transmitted over a first of said multipled control conductors and move off-normal in a second direction to select a line in a particular group of lines, means operative in response to an off-normal position of the respective connector switch in the second direction to control over a second of said control conductors and prevent the transmission of additional groups of impulses over said first control conductor to the connector switches, and means responsive to the operation of said selector switch to a predetermined position to determine the idle or busy condition of a line selected by the respective connector switch at the termination of the transmission of the third group of impulses over the first of said multipled conductors.

12. In a telephone system, a plurality of groups of lines, an impulse responsive two-motion connector switch for each group of lines, talking conductors connected in multiple to each connector switch, a plurality of control conductors connected in multiple to each connector switch, an individual control conductor connected to each of said connector switches respectively, an impulse responsive selector switch operative in response to a first group of impulses to select one of said individual control conductors, means operative over said selected individual control conductor to cause the connector switch individual thereto to move off-normal in a first direction in response to a second group of impulses, means responsive to the off-normal position in the first direction of a respective one of said connector switches to cause said respective switch only to respond to a third group of impulses transmitted over a first of said multipled control control conductors and move off-normal in a second direction to select a line in a particular group of lines, and means responsive to the operation of said selector switch to a predetermined position to determine the idle or busy condition of a line selected by the respective connector switch at the termination of the transmission of the third group of impulses over the first of said multipled conductors.

References Cited in the file of this patent

UNITED STATES PATENTS

| | | |
|---|---|---|
| 2,564,013 | Kessler | Aug. 14, 1951 |
| 2,623,956 | Kessler et al. | Dec. 30, 1952 |

UNITED STATES PATENT OFFICE

CERTIFICATE OF CORRECTION

Patent No. 2,831,930

April 22, 1958

Ernest H. Gatzert

It is hereby certified that error appears in the printed specification of the above numbered patent requiring correction and that the said Letters Patent should read as corrected below.

Column 7, line 39, after "over" insert -- said --; column 9, line 2, for "multiple" read -- multipled --; column 10, line 12, for "and" read -- an --.

Signed and sealed this 6th day of January 1959.

(SEAL)
Attest:

KARL H. AXLINE

Attesting Officer

ROBERT C. WATSON
Commissioner of Patents